March 13, 1973   H. J. VAN DOORNE ETAL   3,720,113
FLEXIBLE CONTINUOUS POWER TRANSMISSION MEANS
Filed April 6, 1971

HUBERTUS JOSEPHUS VAN DOORNE &
HEMMO HERMANNES JOHANNES LUDOPH
INVENTORS

3,720,113
FLEXIBLE CONTINUOUS POWER TRANSMISSION MEANS
Hubertus Josephus van Doorne, Deurne, and Hemmo Hermannes Johannes Ludoph, Heeze, Netherlands; said Ludoph assignor to said Van Doorne, Doornehof, Deurne, Netherlands
Filed Apr. 6, 1971, Ser. No. 131,594
Int. Cl. F16g 5/10
U.S. Cl. 74—236                         3 Claims

ABSTRACT OF THE DISCLOSURE

A flexible continuous transmission means for transferring torque between V-shaped discs wherein a predetermined number of metallic strips is provided along which a plurality of V-shaped members can shift in a longitudinal direction. The V-shaped members link up and extend around the total circumference of the strips, and are blocks made of a non-compressible material, such as metal. In this way the torque is substantially transmitted by the compressive stress through the V-shaped blocks. The V-shaped blocks are so shaped that they can tilt with respect to each other when they are entrained around a disc and the diameter of the tilting line is smaller than that diameter of the innermost metallic strip.

---

The present invention relates to a flexible continuous power transmission means for transmitting torque between two driving discs having a driving surface of generally V-shaped cross-section.

Such a flexible continuous power transmission means is known in the form of a rubber V-belt which acts as a torque transmitting element. A rubber V-belt, however, has its restrictions as to the strength of the material employed. Such a power transmission means with a V-belt extending between two discs enables control of the number of revolutions of the output disc to be effected, by varying the size of the V-shaped opening in one or both of the discs or by varying the pressure with which the belt is forced into said opening. The position of said belt on the disc, and hence the effective diameter of the disc can thus be varied and it is possible to vary the ratio of the input and output number of revolutions continuously.

It is also known to form a flexible continuous transmission means from a predetermined number of metallic strips, on which longitudinally shiftable V-shaped members are mounted, said members linking up and extending around the total circumference of said strips. In this known construction the V-shaped members consists of leather, vulcanized fibers or synthetic materials. Disadvantages of this construction are that the V-shaped members are compressed against each other during use in such a way that apertures are created such that they no longer form a well fitting linking unit and said metallic strips are subject to tractive forces. It is an object of the present invention to avoid these disadvantages.

A further object is to provide a flexible continuous transmission means for transferring torque between V-shaped discs, comprising a predetermined number of metallic strips, along which a plurality of V-shaped members can shift in longitudinal direction, said members linking up and extending around the total circumference of said strips, and consisting of blocks made of non-compressible material, such as metal, in such a way that the torque is substantially transmitted by the compressive stress through the V-shaped blocks.

A further object is to provide a construction wherein the V-shaped blocks also fit closely to the curves of the discs and the V-shaped blocks are formed so that they can tilt with respect to each other, and hence the diameter of the tilting line is smaller than the diameter of the innermost metallic strip.

A still further object is to provide a construction wherein the metallic strips in the flexible continuous transmission means have, in a certain operational condition, such a tensioning effort that said effort is greater than the propelling force to be transmitted at that moment by the V-shaped blocks.

With the above and other objects in view which will become apparent from the detailed description below a preferred embodiment of flexible continuous transmission means according to the invention is shown in the accompanying drawing, in which.

Figure 1:
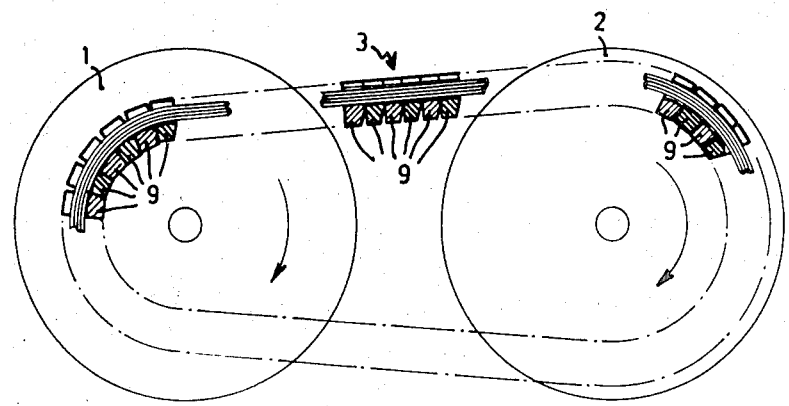
FIG. 1 is a diagrammatic elevation of a transmission means with parts in section.
Figure 2:
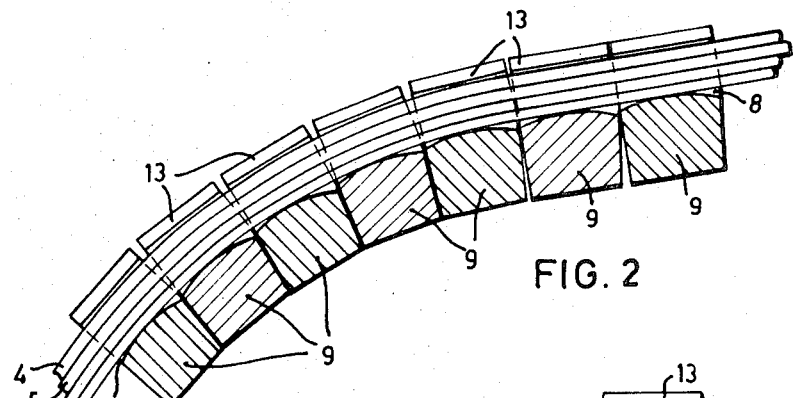
FIG. 2 shows, on an enlarged scale, a sectional view of a portion of the transmission means according to FIG. 1.
Figure 3:
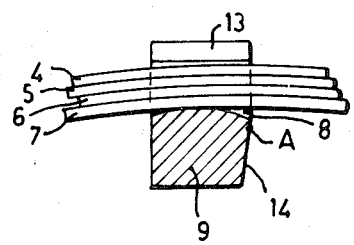
FIG. 3 shows in section, on an enlarged scale, a single block having four metallic strips positioned therein.

Referring to FIG. 1 of the drawing, standard V-shaped discs are indicated at 1 and 2. The disc 1 drives the disc 2 by means of a flexible continuous member 3. Said discs are e.g. of the type having a variable diameter by means of which a continuously variable transmission can be obtained.

Figure 4:
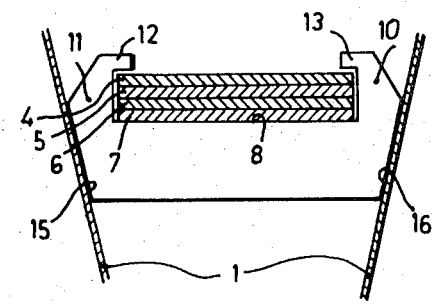
FIG. 4 shows a cross-section of a V-shaped block having four metallic strips located therein and running between the inner side walls of a V-shaped disc.

The flexible continuous member 3 consists of four superimposed steel strips 4, 5, 6 and 7, the innermost one 7 lying on the rounded off topside 8 of each of a plurality of V-shaped blocks 9 made of metal, such as steel. The rounded off sides 8 have a width which corresponds with that of the smallest diameter of the variable discs. The steel strips 4, 5, 6, and 7 are embraced by guiding means forming part of the V-shaped blocks 9 and consisting of lateral guides 10 and 11 (FIG. 4) having top edges 12 and 13 which prevent the steel strips from separating from the V-shaped blocks 9. The V-shaped blocks 9 are bevelled on one side 14 transversely to direction of movement, although they could be bevelled on both their sides transversely to the direction of movement. The remaining sides 15 and 16 coincide with the angle of inclination of the V-shaped discs.

The thickness of the steel strips 4–7, which are superimposed with practically no play, is determined by the diameter of the discs 1, 2. When running through the discs 1 and 2, the bending stress in the steel strips must be admissible.

The blocks 9 are positioned on the set of steel strips or even on one strip only, and lie against each other and extend fully around the internal periphery of the set strips. The blocks are not interconnected by pivots and also are not adhered mechanically to the strips by means of glueing, welding or the like, and hence they can shift longitudinally along the set of strips, although they are fixed thereto in such a way that they cannot drop off. The blocks have bevelled side parts having an inclination, corresponding with the wedge angle of the discs. The blocks 9 have at their inner sides a rounded off portion with radius corresponding with the smallest operational diameter of the discs.

The transmission means between the two discs is tensioned in the same way as a rubber V-belt. The tensioning means are well known per se in the art, and the strips will be tensioned thereby. The blocks will be pulled into the discs by said tensioning means.

What we claim is:

1. A flexible continuous transmission means for transferring torque between V-shaped discs, comprising a predetermined number of metallic strips, a plurality of V-shaped members shiftable in the longitudinal direction along said strips, said members linking up and extending around the total circumference of said strips, said members comprising blocks made of non-compressible material, such as metal, so that the torque is substantially transmitted by the compressive stress through said V-shaped blocks.

2. A flexible continuous transmission means according to claim 1, in which said V-shaped blocks are shaped so that they can tilt with respect to each other when they are entrained around a disc, and in which the diameter of the tilting line is smaller than the diameter of the innermost metallic strip.

3. A flexible continuous transmission means according to claim 1 wherein under a certain operational condition, said strips have such a tensioning effort that at that moment it is greater than the propelling force to be transmitted through said blocks.

References Cited

UNITED STATES PATENTS

| | | | |
|---|---|---|---|
| 3,604,283 | 9/1971 | Van Doorne | 74—231 M |
| 2,170,925 | 8/1939 | Kellenberger | 74—236 |

FOREIGN PATENTS

| | | | |
|---|---|---|---|
| 256,918 | 9/1948 | Switzerland | 74—236 |
| 15,793 | 3/1911 | Denmark | 74—236 |

LEONARD H. GERIN, Primary Examiner